United States Patent
Konczykowska et al.

(10) Patent No.: US 7,023,256 B2
(45) Date of Patent: Apr. 4, 2006

(54) DIFFERENTIAL CODER FOR ELECTRICAL SIGNALS

(75) Inventors: Agnieszka Konczykowska, L'Hay les Roses (FR); Jean Godin, St-Maur-des-Fosses (FR)

(73) Assignee: Alcatel, Paris (FR)

( * ) Notice: Subject to any disclaimer, the term of this patent is extended or adjusted under 35 U.S.C. 154(b) by 48 days.

(21) Appl. No.: 10/892,281

(22) Filed: Jul. 16, 2004

(65) Prior Publication Data

US 2005/0012534 A1    Jan. 20, 2005

(30) Foreign Application Priority Data

Jul. 18, 2003    (FR) .................................. 03 08769

(51) Int. Cl.
   *H03K 3/289*    (2006.01)
(52) U.S. Cl. ...................... 327/202; 327/203; 359/279
(58) Field of Classification Search ...................... None
   See application file for complete search history.

(56) References Cited

U.S. PATENT DOCUMENTS

| | | | |
|---|---|---|---|
| 5,267,269 A * | 11/1993 | Shih et al. .................. | 375/296 |
| 6,337,756 B1 | 1/2002 | Djupsjobacka .............. | 398/183 |
| 6,452,433 B1 * | 9/2002 | Chang et al. ............... | 327/202 |
| 6,496,297 B1 | 12/2002 | Frankel et al. .............. | 359/279 |
| 6,850,104 B1 * | 2/2005 | Fattaruso ..................... | 327/202 |
| 2002/0196508 A1 | 12/2002 | Wei et al. .................... | 398/185 |

OTHER PUBLICATIONS

Kaiser W et al.: "reduced Complexity Optical Duobinary 10-GB/S Transmitter Setup Resulting in an Increased Transmission Distance" IEEE Photonics Technology Letters, IEEE Inc. New York, US, vol. 13, No. 8, Aug. 2001, pp. 884-886, XP001107473.

* cited by examiner

*Primary Examiner*—Tuan T. Lam
(74) *Attorney, Agent, or Firm*—Sughrue Mion, PLLC

(57) ABSTRACT

The present invention relates to a differential coder (10) for electrical signals comprising control means (21, 22) and a bistable T adapted to deliver an output binary data signal (S, S*). The bistable T comprises a master bistable (11) followed by a slave bistable (12), each bistable having a main control input (E1, E2). The differential coder is integrated and said control means comprise a first circuit (21) dedicated to the master bistable and adapted to supply said master control signal (A) injected into the main control input of the master bistable and a second circuit (22) dedicated to the slave bistable, controlled by said clock signal (CK) and adapted to supply a slave control signal (CK2) that is representative of a signal that is complementary to the clock signal and is injected into the main control input of the slave bistable.

8 Claims, 3 Drawing Sheets

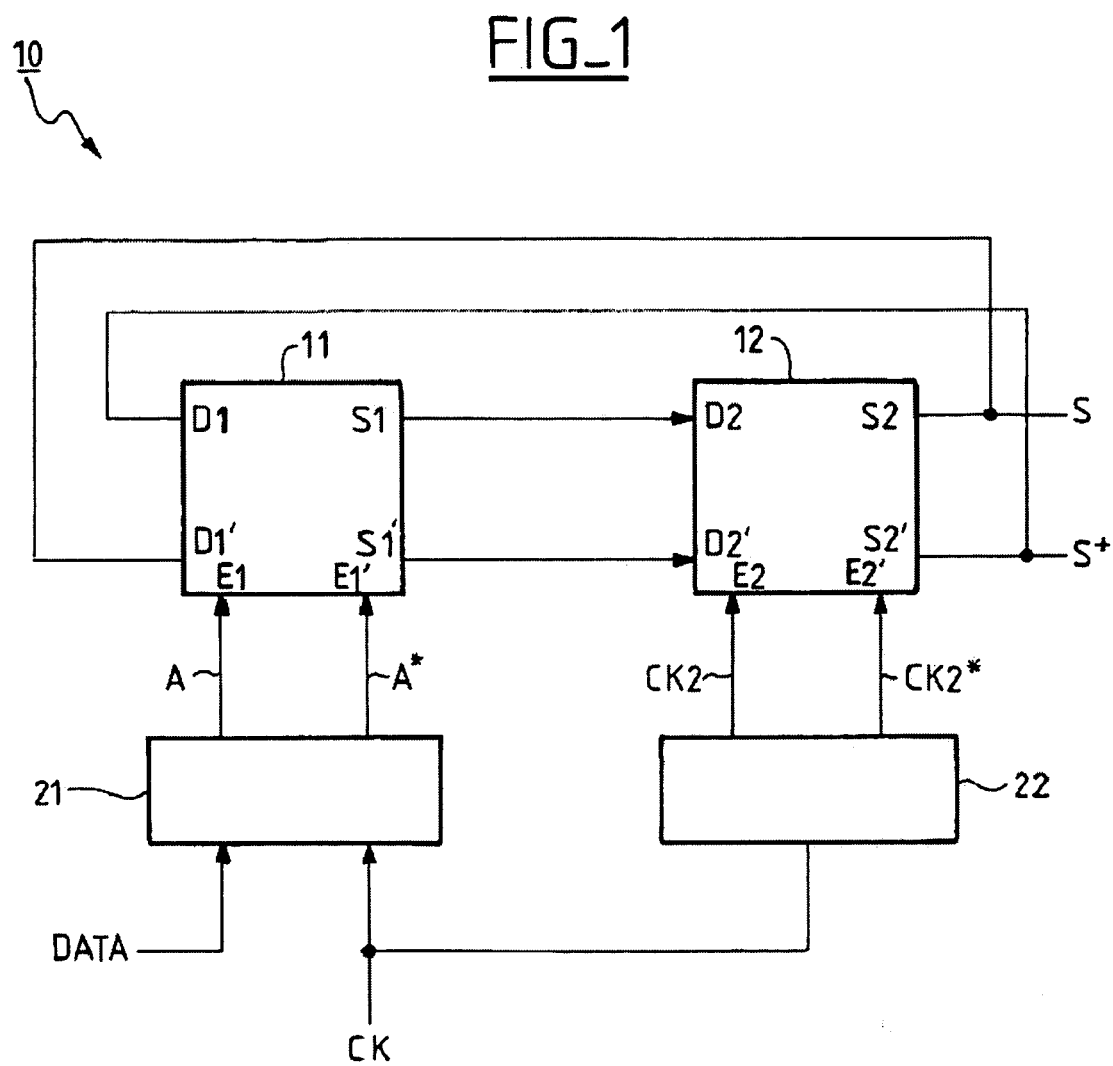

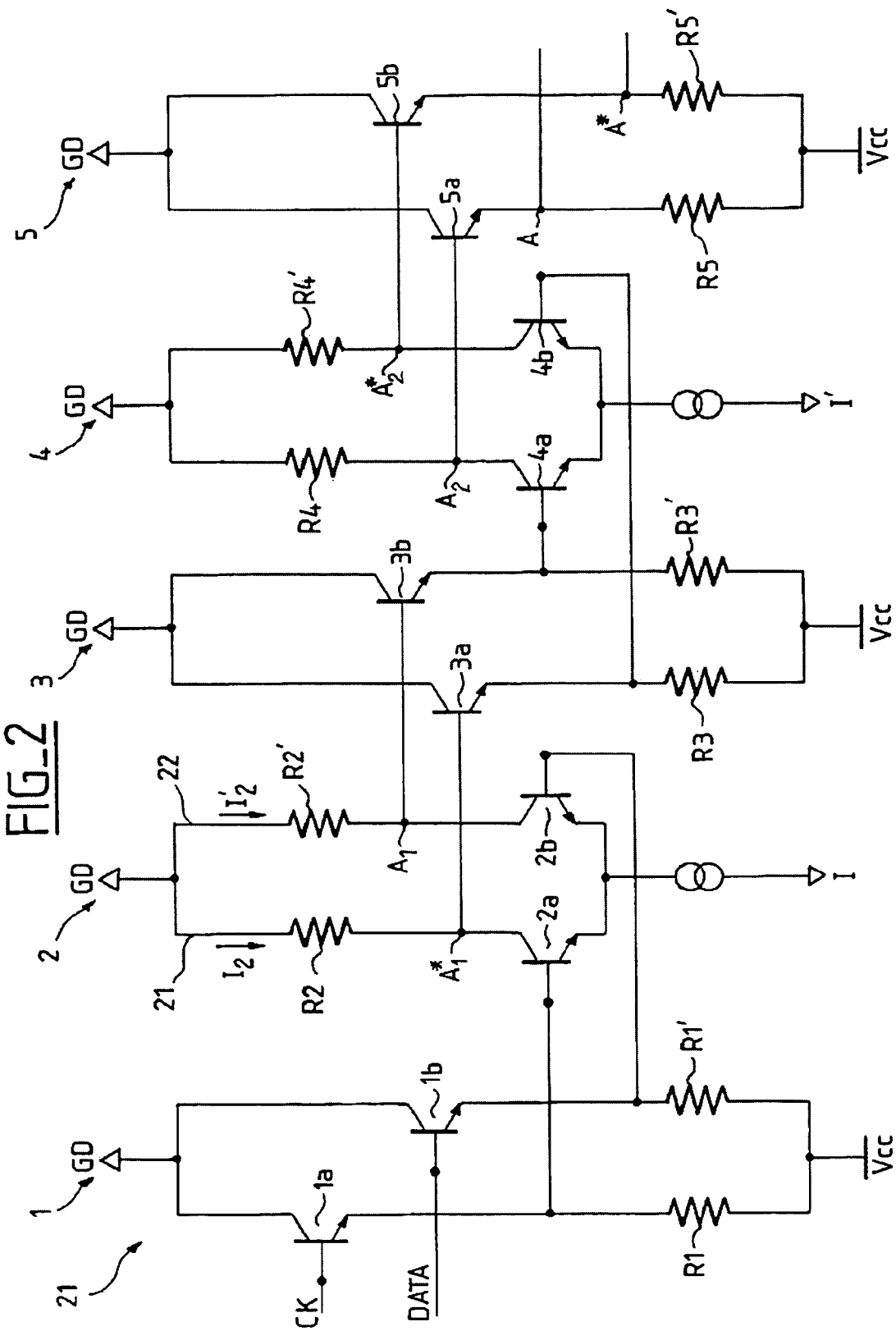

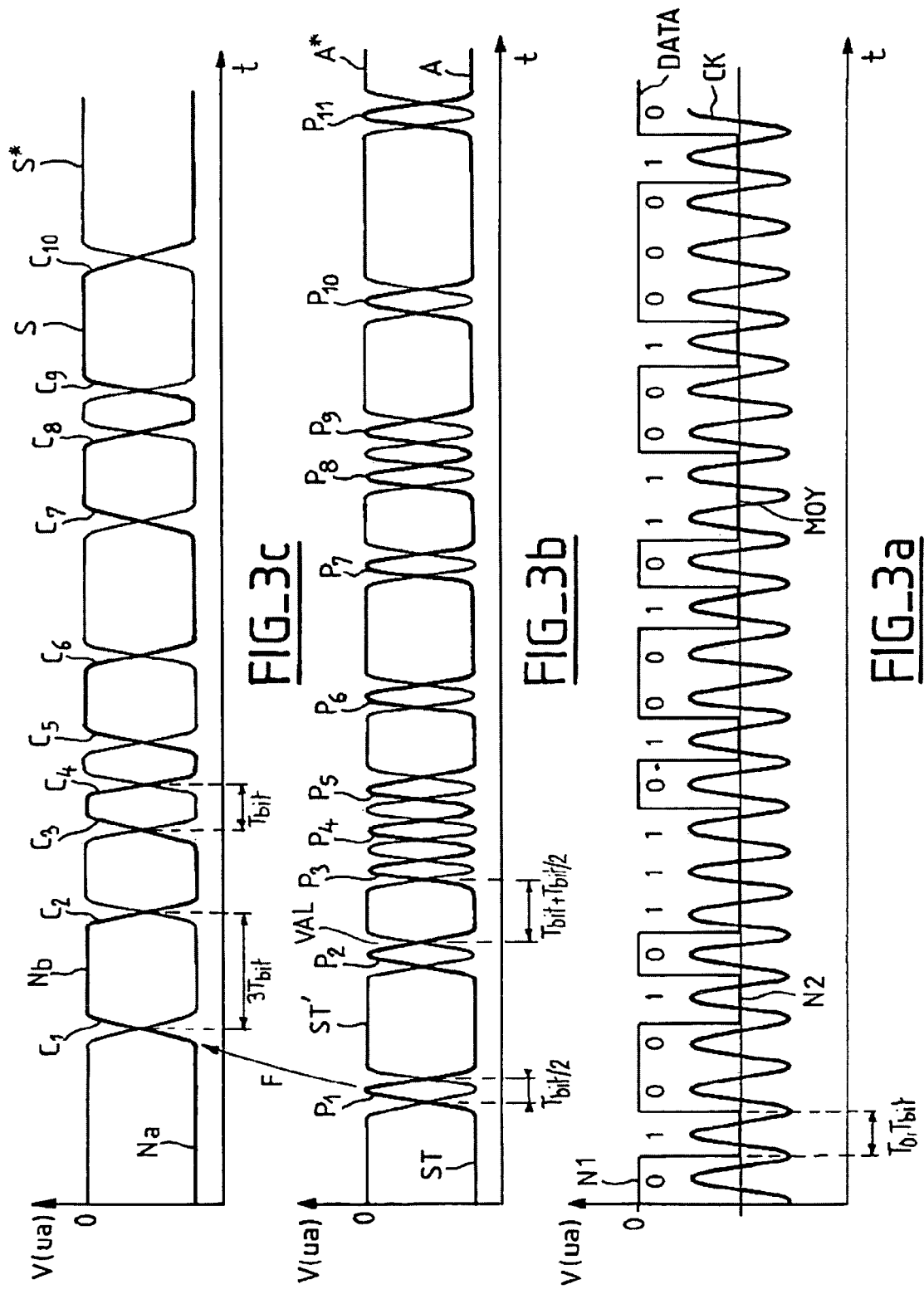

DIFFERENTIAL CODER FOR ELECTRICAL SIGNALS

The present invention relates to the field of electronics as applied in particular to optical telecommunications and to be more precise relates to a differential coder for electrical signals.

Duobinary, phase-shaped binary transmission (PSBT) and differential phase-shift keyed (DPSK) formats are known in the art. They are used for optical transmission of data because, since they occupy less bandwidth, they increase spectral efficiency, i.e. the ratio of modulation frequency to frequency spacing between adjacent transmission channels, and improve tolerance to chromatic dispersion and polarization fluctuations.

To produce an optical signal coded in accordance with one of these formats, an electrical precoded data signal is produced first.

The document "Reduced Complexity Optical Duobinary 10 Gb/s Transmitter Setup Resulting in an Increased Transmission Distance", W. Kaiser et al., IEE Photonics Technology Letters, Vol. 13, No. 8, Aug. 2001, pp. 884–886 proposes a precoder operating at a bit rate of 10 Gbit/s. This precoder consists primarily of two discrete modules: a standard AND logic gate and a bistable T in the form of a toggle flip flop (T-FF).

The AND logic gate receives a sinusoidal clock signal at 10 GHz and an input data signal at an identical bit frequency and in the form of a data sequence corresponding to the binary value '0' or to the binary value '1' in a non return to zero (NRZ) format. The AND logic gate supplies at its output a signal for controlling the bistable T that is similar to the clock signal when the input binary value is '1' and remains constant when the binary value is '0'.

The bistable T changes state if the control signal corresponds to a clock signal, i.e. when the input data corresponds to the binary value '1'. The bistable T does not change state if the control signal is constant, i.e. when the input data corresponds to the binary value '0'.

The AND logic gate has a bandwidth that is limited by its technology. At high frequencies, i.e. at frequencies above 10 GHz, the gate may produce a control signal with insufficiently steep rising and falling edges and/or that is deformed, i.e. a control signal whose amplitude is too low to be detected by the bistable T. Thus data may be lost and the precoded signal may be of poor quality.

Furthermore, the logic gate presupposes accurate alignment of the clock and the input data signal.

The invention aims to provide a simple differential coder for electrical signals that is able to supply a binary data signal of high quality, even at high bit rates.

To this end, the invention proposes a differential coder for electrical signals, comprising:
control means adapted:
to receive a clock signal defining a bit time and an input binary data signal substantially synchronized with the clock signal and defining a sequence of first and second values in accordance with a non return to zero format, and
to supply a control signal defined by a stable level and by a change of level that is triggered when the input data signal corresponds to the second value, and
a bistable T controlled by the control means and adapted to supply an output data signal that has a low level and a high level and is defined by:
the same binary state over two successive bit times when the control signal is maintained at a stable level, and
a change of state associated with a change from either the low level or the high level to the high level and the low level triggered by said change of level, respectively which coder is characterized in that the bistable T comprises a master bistable followed by a slave bistable each having a main control input, and in that the differential coder is integrated and said control means comprise:
a first circuit dedicated to the master bistable and adapted to supply said master control signal which is injected into the main control input of the master bistable, and
a second circuit dedicated to the slave bistable, controlled by said clock signal and adapted to supply a slave control signal that is representative of a signal complementary to the clock signal and injected into the main control input of the slave bistable.

The differential coder of the invention is integrated in the sense that the control means and the bistable T are combined in the same circuit and are optimized with respect to each other. Furthermore, integration enables the master bistable and the slave bistable to be controlled differently. Thus the slave bistable receives a slave control signal that is clean and regular, i.e. clear of switching noise and of sufficient amplitude. This guarantees an output data signal free of jitter and having clear transitions.

During the change of level, the master control signal is substantially in phase with the clock signal and substantially in phase opposition with the slave control signal.

This kind of circuit has a simple architecture and is more robust and is therefore able to operate at high bit rates. The control means of the invention tolerate a wider phase margin between the input data signal and the clock signal. Integration also has the advantage of reducing electrical power consumption.

The duration of the change of level may be equal to or advantageously less than the bit time, whereas with an AND gate it is strictly equal to a bit time. The duration of the change of level is preferably made substantially equal to half the bit time.

The first circuit is preferably adapted to supply a subsidiary master control signal that is complementary to said master control signal or constant and injected into a subsidiary control input of the master bistable. The second circuit may be adapted to supply a subsidiary slave control signal that is complementary to said slave control signal or constant and injected into a subsidiary control input of the slave bistable.

In a preferred embodiment, the first circuit comprises an analogue comparator for comparing the input data signal and the clock signal and is adapted to supply at least said master control signal.

In this preferred embodiment, the analogue comparator may comprise a differential pair with two transistors voltage-controlled by the clock signal and the input data signal, respectively, and adapted to supply a subsidiary master control signal that is complementary to said master control signal and is injected into a subsidiary control input of the master bistable. Said second value is selected from the range of values of the clock signal.

Furthermore, the first circuit may comprise a signal amplification stage downstream of the analogue comparator and of similar structure to the analogue comparator.

The differential coder of the invention may preferably be based on heterojunction bipolar transistors, which are particularly fast.

The invention applies equally to a coder selected from duobinary coders, PSBT coders and DPSK coders and including a precoder corresponding to the differential coder as defined above.

The features and advantages of the invention will become clearly apparent in the light of the following description, which is given by way of illustrative and non-limiting example and with reference to the appended drawings, in which:

FIG. 1 represents diagrammatically a preferred embodiment of an integrated differential coder of the invention for electrical signals, FIG. 2 represents diagrammatically a first circuit from FIG. 1, FIG. 3a relates to the differential coder shown in FIGS. 1 and 2 and represents diagrammatically the respective profiles as a function of time of a clock signal and an input data signal, FIG. 3b relates to the differential coder shown in FIGS. 1 and 2 and represents diagrammatically the respective profiles as a function of time of a master control signal and a subsidiary master control signal, and FIG. 3c relates to the differential coder shown in FIGS. 1 and 2 and represents diagrammatically the respective profiles as a function of time of output binary data signals.

FIG. 1 shows an integrated differential coder 10 for electrical signals comprising a bistable T, comprising a master bistable 11 and a slave bistable 12, and a control circuit, comprising a first circuit 21 and a second circuit 22.

Each of the master and slave bistables 11, 12 comprises, in a standard configuration:
- a respective main local input D1, D2 and a respective subsidiary local input D1', D2',
- a respective main output S1, S2 and a respective subsidiary output S1', S2', and
- a respective main control input E1, E2 and a respective subsidiary control input E1', E2'.

The main local input D1 of the master bistable 11 is connected to the subsidiary output S2' of the slave bistable 12. The subsidiary local input D1' of the master bistable 11 is connected to the main output S2 of the slave bistable 12. The main and subsidiary outputs of the master bistable 11 are respectively connected to the main and subsidiary inputs of the slave bistable 12.

In one variant, a crossover is effected between the outputs S1, S1' of the master bistable 11 and the inputs D2, D2' of the slave bistable 12.

The main and subsidiary outputs S2, S2' of the slave bistable 12 respectively deliver an output data signal S and its complement S*, these signals being precoded signals used to form a duobinary, PSBT or DPSK signal.

The first circuit 21, dedicated to the master bistable 11, receives a clock signal CK and an input data signal DATA substantially synchronized with the clock signal.

The first circuit 21 supplies at its output a master control signal A that is injected into the main control input E1 and a subsidiary master control signal A* that is complementary to said first master control signal A and is injected into the subsidiary control input E1'.

In a first variant, the circuit 21 delivers a constant subsidiary master signal A*.

The second circuit 22 is dedicated to the slave bistable 12, receives the clock signal CK and supplies a slave control signal CK2 that is injected into the main control input E2 and is representative of the complement of the clock signal and a subsidiary slave control signal CK2* that is representative of (for example similar to) the clock signal and is injected into the subsidiary control input E2'.

In the first variant already referred to, the circuit 22 delivers a constant subsidiary slave control signal CK2*.

Thus the slave control signal CK2 is a sinusoid, for example, and substantially in phase opposition with the master control signal A when it changes level.

Likewise, the subsidiary slave control signal CK2* is substantially in phase opposition with the subsidiary master control signal A* when it changes level.

The operation of the differential coder is described with reference to FIG. 2, which shows in detail a preferred embodiment of the structure of the first circuit 21, and FIGS. 3a to 3c, which are timing diagrams of the characteristic signals CK, DATA, A, A*, S, S*.

The first circuit 21 comprises in succession:
- an optional input or first impedance matching stage 1,
- an analogue signal comparator 2,
- an optional intermediate or second impedance matching stage 3,
- an optional signal amplification and shaping stage 4, and
- an optional final impedance matching stage 5.

Each impedance matching stage 1, 3, 5 is formed of respective identical heterojunction bipolar transistors 1a to 1b, 3a to 3b, 5a to 5b, for example, coupled to respective identical resistors R1 to R1', R3 to R3', R5 to R5' to form emitter follower circuits. Each of the resistors R1 to R5' has a value of approximately 100 Ohms, for example.

The collectors of the transistors 1a to 1b, 3a to 3b, and 5a to 5b are connected to a stable potential GND and the resistors R1 to R5' are connected to another stable potential $V_{CC}$.

The analogue comparator 2 comprises first and second bipolar transistors 2a, 2b connected in a common emitter configuration and thus forming a differential pair connected to a source I of a current of 35 mA, for example.

The collectors are connected to identical first and second load resistors R2, R2' with a resistance of approximately 25 Ohms, for example. The load resistors R2, R2' are also connected to a stable voltage GND which biases this differential pair.

In a similar manner, the signal amplification and shaping stage 4 comprises two bipolar transistors 4a, 4b in a common emitter configuration connected to a source I' of a current of 25 mA, for example, forming a second differential pair.

The collectors are connected to identical load resistors R4, R4' with a resistance of approximately 25 Ohms, for example. The load resistors R4, R4' are also connected to a stable voltage GND which biases this second differential pair.

As shown in FIG. 3a, the clock signal CK is a voltage, for example a sinusoidal voltage from −800 mV to −200 mV, with a mean level MOY equal to approximately −500 mV, for example, and having a period $T_0$, for example a period of 25 ps, corresponding to a frequency of 40 GHz.

An input data signal DATA is chosen, for example a voltage in the form of pulses, having a bit time $T_{bit}$ equal to the clock period $T_0$, and preferably synchronized to the clock signal CK.

The data signal DATA has a first level N1 greater than the values taken by the clock signal, for example equal to approximately 0 mV, and a second level N2 between the minimum and maximum values taken by the clock signal CK and preferably, for the optimum adjustment, equal to the mean level MOY.

After passing through one of the transistors of the first impedance matching circuit 1a, the clock signal CK drives the base of the first transistor 2a of the comparator 2.

Similarly, after passing through the other transistor of the first impedance matching circuit 1b, the input data signal DATA drives the base of the second transistor 2b of the comparator 2. Thus the signals CK and DATA are voltage-control signals for the first differential pair.

The input data signal DATA defines a data sequence conforming to a non return to zero format, the first level N1 corresponds to a binary value or logic state '0', for example, and the second level N2 corresponds to a binary value or logic state '1', for example. Thus the sequence shown in FIG. 3a is 0100101110100101100100010.

$I_2$ denotes the current flowing in a first branch 21 including the first load resistor R2 and the first transistor 2a of the comparator 2 and $I'_2$ denotes the current flowing in a second branch 22 including the second load resistor R2' and the second transistor 2b of the comparator 2.

The intermediate output voltage $A_1$ is the output voltage of the comparator 2 at the collector of the second transistor 2b of the comparator 2 and the complementary intermediate output voltage $A^*_1$ is the output voltage complementary to the output voltage $A_1$ at the collector of the first transistor 2a of the comparator 2.

When the input data signal DATA takes the first level N1, all the current I flows in the first branch 21 because the clock signal CK is at a level higher than this level N1 throughout the bit time.

The current $I_2$ is then substantially equal to I, whereas the current $I'_2$ is very low; the intermediate output voltage $A_1$ (respectively $A^*_1$) is forced (stabilized) to its minimum (respectively maximum) level.

Conversely, when the data signal DATA takes the second level N2, the current I flows in the second branch 22 because the clock signal CK is at a level lower than this level N2 for half a bit time.

During the same time period, the intermediate output voltage A1 increases from a very low minimum value to a maximum value and then returns to the minimum value, thus forming a peak with a mid-height width substantially equal to half a bit time. The complementary intermediate output voltage $A^*_1$ decreases from a maximum value to a minimum value and then returns to the maximum value, thus forming a trough.

After passing through one of the transistors 3b of the second matching circuit 3, the intermediate output voltage $A_1$ drives the base of the first transistor 4a of the amplifier stage 4. Similarly, after passing through the other transistor 3a of the second matching circuit 3, the complementary intermediate output voltage $A^*_1$, drives the base of the second transistor 4b of the amplifier stage 4.

The second differential pair therefore supplies at its output amplified and shaped final output voltages $A_2$, $A^*_2$ reproducing the profile of the peaks and troughs of the intermediate output voltages $A_1$, $A^*_1$.

After passing through the final matching circuit 5, the final output voltages $A_2$, $A^*_2$ provide the optimized master and subsidiary master control signals A, A* shown in FIG. 3b.

In a variant, the first circuit 21 comprises no second amplification stage and no matching stages 3 and 5; the signals $A_1$ and $A^*_1$ are then the control signals of the master bistable.

The master control signal A is therefore defined by a stable minimum level ST, for example −500 mV, and by a change of level or peak $P_1$ to $P_{11}$ of mid-height width $t_1$ substantially equal to half a bit time and with a maximum value equal to 0 mV, for example. The complementary control signal A is defined by a stable maximum level ST' and by a change of level or trough VAL whose mid-height width is substantially equal to half a bit time.

As shown by the arrow F in FIG. 3c, each peak $P_1$ to $P_{11}$ triggers a change of state associated with a change of level $C_1$ to $C_{10}$ of the binary data output signal S. Each change of level $C_1$ to $C_{10}$ has a duration less than or equal to the bit time, for example one third of the bit time.

To be more precise, in this example, there is a change from a state '0' or '1' to the other state '1' or '0' at the mid-height of the signal.

Alternatively, if one of the levels is particularly affected by noise, the change of level may be effected nearer the less noisy level (this is not shown in the figures).

If the control signal A remains at the stable level ST for substantially two bit times, the binary output signal S is in a stabilized binary state over two bit times, for example two successive binary values '0'.

When the control signal A changes level, the binary output signal S changes state, for example from '0' to '1'.

The output data signal S has a low level Na of −500 mV, for example, and a high level Nb of approximately 0 mV, for example.

Similarly, each trough VAL triggers a change of state associated with switching of the complementary binary data output signal S*.

Of course, the foregoing description has been given by way of purely illustrative example. Any means may be replaced by equivalent means without departing from the scope of the invention.

What is claimed is:

1. A differential coder (10) for electrical signals, comprising:
control means (21, 22) adapted:
to receive a clock signal (CK) defining a bit time and an input binary data signal (DATA) substantially synchronized with the clock signal and defining a sequence of first and second values (N1, N2) in accordance with a non return to zero format, and
to supply a master control signal (A) defined by a stable level (ST) and by a change of level ($P_1$ to $P_{11}$) that is triggered when the input binary data signal corresponds to the second value, and
a bistable T controlled by the control means and adapted to supply an output binary data signal (S, S*) having a low level (Na) and a high level (Nb) and which is defined by:
the same binary state ('0', '1') over two successive bit times when the master control signal is maintained at the stable level, and
a change of state associated with a change ($C_1$ to $C_{10}$) from either the low level or the high level to the high level or the low level triggered by said change of level, respectively
which coder is characterized in that the bistable T comprises a master bistable (11) followed by a slave bistable (12) each having a main control input (E1, E2), and in that the differential coder is integrated and said control means comprise:

a first circuit (21) dedicated to the master bistable and adapted to supply said master control signal (A) which is injected into the main control input of the master bistable, and a second circuit (22) dedicated to the slave bistable, controlled by said clock signal (CK) and adapted to supply a slave control signal (CK2) that is representative of a signal complementary to the clock signal and injected into the main control input of the slave bistable.

2. A differential electrical signal coder (10) according to claim 1, characterized in that the duration of the change of level is less than or equal to the bit time and preferably substantially equal to half a bit time.

3. A differential electrical signal coder (10) according to claim 1, characterized in that the first circuit (21) is adapted to supply a subsidiary master control signal (A*) that is either complementary to said master control signal or constant and is injected into a subsidiary control input (E1') of the master bistable and the second circuit (22) is adapted to supply a subsidiary slave control signal that is either complementary to said slave control signal (CK2*) or constant and is injected into a subsidiary control input (E2') of the slave bistable.

4. A differential electrical signal coder (10) according to claim 1, characterized in that the first circuit (21) comprises an analogue comparator (2) for comparing the input binary data signal (DATA) and a clock signal (CK) and adapted to supply at least said master control signal (A).

5. A differential electrical signal coder (10) according to claim 4, characterized in that the analogue comparator (2) comprises a differential pair comprising two transistors (2a, 2b) voltage-controlled by the clock signal (CK) and by the input binary data signal (DATA), respectively, and adapted to supply a subsidiary master control signal (A*) that is complementary to said master control signal and is injected into a subsidiary control input (E1') of the master bistable and said second value (N2) is selected from the values of the clock signal (CK).

6. A differential electrical signal coder (10) according to claim 4, characterized in that the first circuit (21) comprises a signal amplification stage (3) downstream of the analogue comparator (2) and of similar structure to the analogue comparator.

7. A differential electrical signal coder (10) according to claim 1, characterized in that it is based on heterojunction bipolar transistors (2a to 4b).

8. A differential electrical signal coder (10) selected from duobinary coders, PSBT coders and DPSK coders including a precoder corresponding to the differential coder according to claim 1.

* * * * *